US012553816B2

(12) United States Patent
Allier et al.

(10) Patent No.: US 12,553,816 B2
(45) Date of Patent: Feb. 17, 2026

(54) METHOD FOR CHARACTERISING SPERM CELLS

(71) Applicant: COMMISSARIAT A L'ENERGIE ATOMIQUE ET AUX ENERGIES ALTERNATIVES, Paris (FR)

(72) Inventors: Cédric Allier, Grenoble (FR); Olivier Cioni, Grenoble (FR); Ondrej Mandula, Grenoble (FR); Agnès Camus, Sainte Gauburge Ste Colombe (FR); Eric Schmitt, Villaines la Juhel (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 222 days.

(21) Appl. No.: 18/258,726

(22) PCT Filed: Dec. 20, 2021

(86) PCT No.: PCT/EP2021/086909
§ 371 (c)(1),
(2) Date: Jun. 21, 2023

(87) PCT Pub. No.: WO2022/136325
PCT Pub. Date: Jun. 30, 2022

(65) Prior Publication Data
US 2024/0044771 A1 Feb. 8, 2024

(30) Foreign Application Priority Data
Dec. 22, 2020 (FR) ..................................... 20 13979

(51) Int. Cl.
*G06V 10/44* (2022.01)
*G01N 15/1433* (2024.01)
*G01N 15/10* (2006.01)

(52) U.S. Cl.
CPC ....... *G01N 15/1433* (2024.01); *G06V 10/454* (2022.01); *G01N 2015/1006* (2013.01)

(58) Field of Classification Search
CPC .......................... G01N 15/1433; G06V 10/454
See application file for complete search history.

(56) References Cited

U.S. PATENT DOCUMENTS 10,458,897 B2  10/2019  Perraut et al.
2011/0090332 A1*  4/2011  Hing ...................... G01J 3/0286
                                                             348/135

(Continued)

FOREIGN PATENT DOCUMENTS

EP      3 572 798 A1    11/2019
EP      3274694 B1      12/2019
WO   WO 2019/125583 A1   6/2019

OTHER PUBLICATIONS

Newby et al, "Convolutional neural networks automate detection for tracking of submicron-scale particles in 2D and 3D", PNAS, Sep. 2018, pp. 9026-9031 (Year: 2018).*

(Continued)

*Primary Examiner* — Edward Park
(74) *Attorney, Agent, or Firm* — Oblon, McClelland, Maier & Neustadt, L.L.P.

(57) ABSTRACT

A method for characterizing a mobile particle in a sample includes acquisition of at least one image of the sample during an acquisition period, using an image sensor and formation of a series of images, the series of images comprising at least one image; use of each image of the series of images as input image of a detection convolutional neural network, the detection convolutional neural network being configured to detect the particles and to produce, from each image, an output image on which each detected particle is assigned a distribution of intensity, centered on the particle and extending around the particle; for each detected particle, (Continued)

from each output image, estimation of a position of each detected particle in each image of the series of images; and characterization of each detected particle from the estimation of the position established from each image of the series of images.

17 Claims, 9 Drawing Sheets

(56) References Cited

U.S. PATENT DOCUMENTS

| | | | | |
|---|---|---|---|---|
| 2012/0148141 | A1* | 6/2012 | Ozcan | G01N 15/1434 |
| | | | | 382/133 |
| 2019/0187453 | A1* | 6/2019 | Mandula | G01N 21/6486 |

OTHER PUBLICATIONS

Dardikman-Yoffe et al, "High-resolution 4-D acquisition of freely swimming human sperm cells without staining", Science advances, Apr. 2020, pp. 1-13 (Year: 2020).*
Satat et al, "Lensless Imaging With Compressive Ultrafast Sensing", IEEE, Sep. 2017, pp. 398-407 (Year: 2017).*
International Search Report and Written Opinion issued Apr. 13, 2022 in PCT /EP2021/086909, filed on Dec. 20, 2021, 19 pages.
Amann et al., "Computer-assisted sperm analysis (CASA): Capabilities and potential developments", Theriogenology, vol. 81, No. 1, 2014, 16 pages.

* cited by examiner

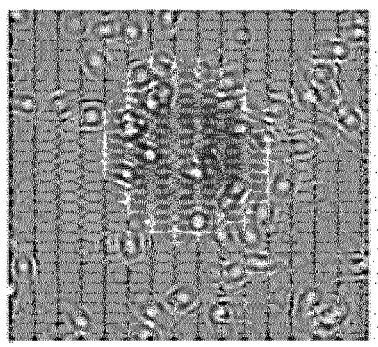 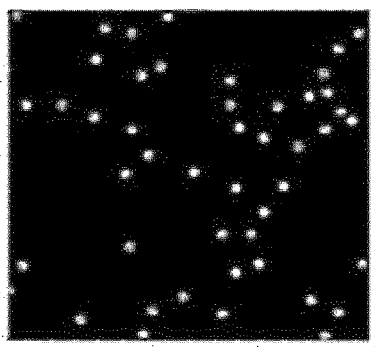 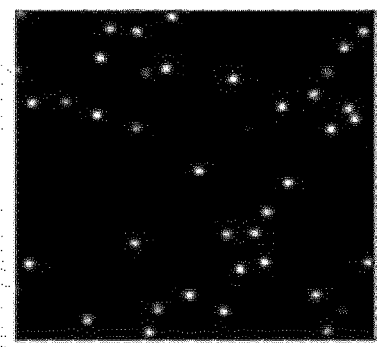
Fig. 7A Fig. 7B Fig. 7C
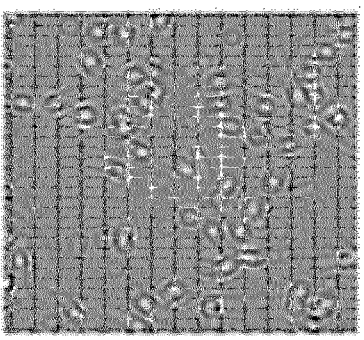 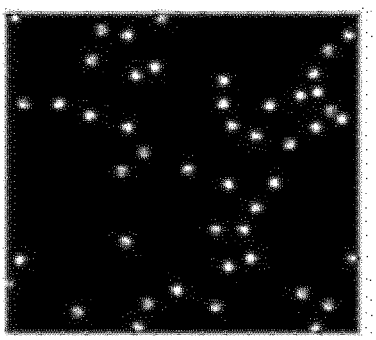 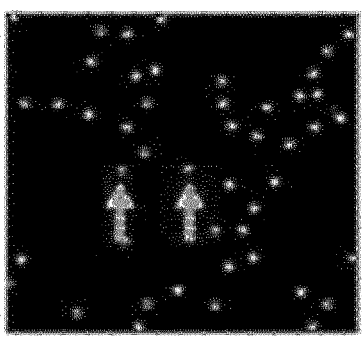
Fig. 8A Fig. 8B Fig. 8C

METHOD FOR CHARACTERISING SPERM CELLS

TECHNICAL FIELD

The technical field of the invention is the observation of mobile or motile microscopic particles in a sample, with a view to the characterization thereof. One application targeted is the characterization of sperm cells.

PRIOR ART

The observation of motile cellular particles, such as sperm cells, in a sample, is usually performed using a microscope. The microscope comprises a lens defining an object plane, extending in the sample, and an image plane, merged with a detection plane of an image sensor. The microscope takes images of the sperm cells according to a focused configuration. The choice of such a modality presupposes a trade-off between spatial resolution, observed field and depth of field. The higher the numerical aperture of the lens, the better the spatial resolution, to the detriment of the size of the field observed. Similarly, a high numerical aperture reduces the depth of field.

It is understood that the observation of motile particles presupposes an optimization of the lens, bearing in mind that, in such a configuration, it is not possible to obtain both a good spatial resolution, a wide observed field and a great depth of field. Now, these properties are particularly important in the observation of motile microscopic particles, notably when the latter are numerous:
- the size of the particles necessitates a good spatial resolution;
- their number justifies an extended observed field, so as to be able to maximize the number of particles observed on a same image;
- their motion requires a significant depth of field, such that the particles appear cleanly on the image.

Given these imperatives, it is standard practice to use a microscope with high magnification. The small size of the observed field is compensated by the use of a translation plate. The latter allows an acquisition of images by offsetting the lens relative to the sample, parallel thereto. The small depth of field is compensated by limiting the thickness of the sample: the latter is for example disposed in a fluidic chamber of small thickness, typically less than 20 µm, so as to limit the displacement of the particles in a direction at right angles to the object plane. Moreover, the lens can be brought closer to or moved further away from the sample, so as to displace the object plane in the sample, according to its thickness. The result thereof is a device that is complex and costly, requiring accurate displacement of the lens.

The document WO2019/125583 describes the general principles relating to the analysis of the motility or of the morphology of sperm cells, by describing the use of a supervised learning artificial intelligence algorithm.

The publication by Amann R. et al. "Computer-assisted sperm analysis (CASA): Capabilities and potential developments", describes the use of a conventional, focused imaging device, using a fluidic chamber of small thickness.

One alternative to conventional microscopy, as described in the abovementioned publication, has been proposed by lensless imaging. It is known that lensless imaging, coupled with holographic reconstruction algorithms, allows observation of cells while conserving a high observation field, as well as a great depth of field. The patents U.S. Pat. Nos. 9,588,037 or 8,842,901 describe for example the use of lensless imaging for the observation of sperm cells. Patents U.S. Pat. Nos. 10,481,076 or 10,379,027 also describe the use of lensless imaging, coupled with reconstruction algorithms, for characterizing cells.

It is known that the use of numeric reconstruction algorithms makes it possible to obtain sharp particle images. Such algorithms are for example described in U.S. Pat. No. 10,564,602, US20190101484 or US20200124586. In this type of algorithm, from a hologram acquired in a detection plane, an image of the sample is reconstructed in a reconstruction plane, remote from the detection plane. It is standard practice for the reconstruction plane to extend through the sample. However, this type of algorithm may require relatively lengthy computation time.

Such a constraint is acceptable when the particles are considered as immobile in the sample. However, when wanting to characterize mobile particles, and in particular motile particles, the computation time can become too great. Indeed, the characterization of mobile particles necessitates acquisition of several images, at high frequencies, so as to be able to characterize the motion of the particles in the sample.

The inventors are proposing an alternative to the abovementioned patents, that makes it possible to characterize motile particles, and in particular sperm cells, by using a simple observation method. The method devised by the inventors allows for characterization of a great number of particles without necessitating displacement of a lens relative to the sample.

SUMMARY OF THE INVENTION

A first subject of the invention is a method for characterizing at least one mobile particle in a sample, the method comprising:
a) acquisition of at least one image of the sample during an acquisition period, using an image sensor and formation of a series of images from the acquired images;
b) use of each image of the series of images resulting from a) as input images of a detection convolutional neural network, the detection convolutional neural network being configured to detect the particles and to produce, from each image, an output image on which each detected particle is assigned a distribution of intensity centered on the particle and extending around the particle;
c) for each detected particle, from each output image resulting from b), estimation of a position of each detected particle in each image of the series of images;
d) characterization of each detected particle from the estimation of the position resulting from c), established from each image of the series of images.

According to one possibility, the steps a) to d) can be performed with a single image. In this case, the series of images comprises a single image.

According to one possibility, on the output image, each particle can be represented in the form of a dot.

The particle (or each particle) can notably be a sperm cell.

Step d) can comprise a characterization, notably morphological, of each detected sperm cell. The step d) then comprises:
for each detected sperm cell, from each image resulting from a), and from the positions resulting from c), extraction of a thumbnail image comprising the detected sperm cell, the position of the detected sperm cell in the thumbnail image being predetermined, so as to obtain, for each detected sperm cell, a series of thumbnail images, the size of each thumbnail image being less than the size of each image acquired in the step a);

for each detected sperm cell, use of the series of thumbnail images as input data of a classification neural network, the classification neural network being configured to classify the sperm cell from among predetermined classes. They can notably be morphological classes.

The method can be such that each detected sperm cell is centered with respect to each thumbnail image.

Step d) can comprise a characterization of the motility of the sperm cell. Step d) can then comprise, from the positions of the sperm cell resulting from the step c):

a determination of a trajectory of the sperm cell during the acquisition period;

a calculation of a speed of the sperm cell from the trajectory;

a classification of the sperm cell as a function of the speed.

The method can comprise:

a determination of a distance, in a straight line, between a first point and a last point of the trajectory, and a calculation of a linear trajectory speed from said distance;

and/or a determination of distances traveled between each acquired image, and a calculation of a curvilinear trajectory speed from said distances;

and/or a determination of a smoothed trajectory, and a calculation of an average trajectory speed from the smoothed trajectory.

According to one embodiment, the sample extends on a plane of the sample;

the image sensor extends on a detection plane;

the optical system extends between the sample and the image sensor, the optical system defining an object plane and an image plane;

the object plane is offset with respect to the plane of the sample by an object defocusing distance and/or the image plane is offset with respect to the plane of the sample by an image defocusing distance.

In such an embodiment, the method can be such that:

the sample is disposed on a sample support, resting on at least one spring, the spring being configured to push the support sample toward the optical system;

the optical system is linked to at least one stop, extending, from the optical system, toward the sample support;

such that, during the step a), under the effect of the spring, the sample support is pressed onto the stop.

According to one embodiment, no image-forming optic extends between the sample and the image sensor.

According to one embodiment, the step a) comprises a normalization of each acquired image by an average of said image or by an average of images of the series of images. In this case, the series of images is taken from each acquired image, after normalization.

According to one embodiment, the step a) comprises an application of a high-pass filter to each acquired image. In this case, the series of images is taken from each acquired image, after application of the high-pass filter.

Advantageously, in the step b), the distribution of intensity assigned to each particle is decreasing, such that the intensity decreases as a function of the distance with respect to the particle.

Advantageously, in the step b), the distribution of intensity assigned to each particle can be a two-dimensional parametric statistical distribution.

A second subject of the invention is a device for observing a sample, the sample comprising mobile particles, the device comprising:

a light source, configured to illuminate the sample;

an image sensor, configured to form an image of the sample;

a holding structure, configured to hold the sample between the light source and the image sensor;

a processing unit, linked to the image sensor, and configured to implement the steps a) to d) of a method according to the first subject of the invention from at least one image acquired by the image sensor.

According to one embodiment, no image-forming optic extends between the image sensor and the sample. The holding structure can be configured to maintain a fixed distance between the image sensor and the sample.

According to one embodiment, the image sensor extends on a detection plane;

the device comprises an optical system, extending between the image sensor and the support plane, the optical system defining an image plane and an object plane, the device being such that:

the image plane is offset with respect to the detection plane by an image defocusing distance;

and/or the support plane is offset with respect to the object plane by an object defocusing distance.

The invention will be better understood on reading the explanation of the exemplary embodiments presented, hereinafter in the description, in association with the figures listed below.

FIGURES

Figures 4A, 4B, 4C:
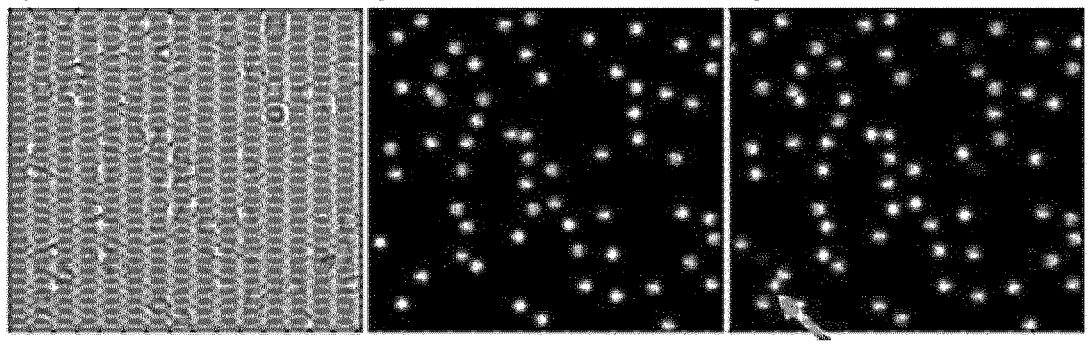

FIGS. 4A, 4B and 4C respectively represent an acquired image, a reference image and an image resulting from the detection neural network.

Figures 5A, 5B:
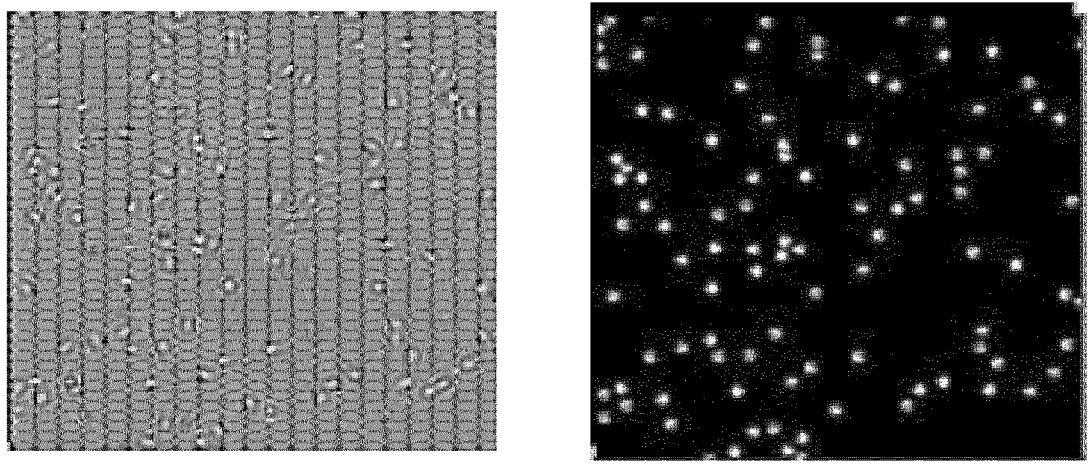
Figure 5C:
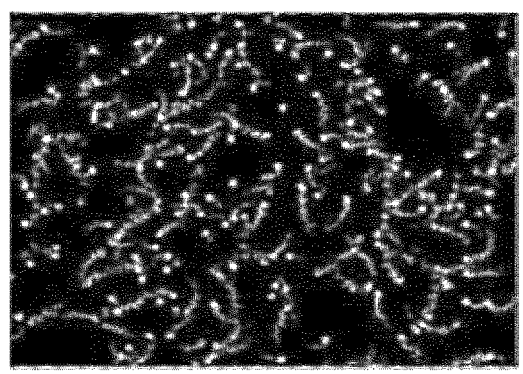

FIG. 5A is an example of image of a sample obtained by implementing a device according to the first embodiment of the invention. FIG. 5B shows the image represented in FIG. 5A after processing by a detection neural network. FIG. 5C shows an example of obtaining trajectories of particles detected in the image 5B.

Figure 6:
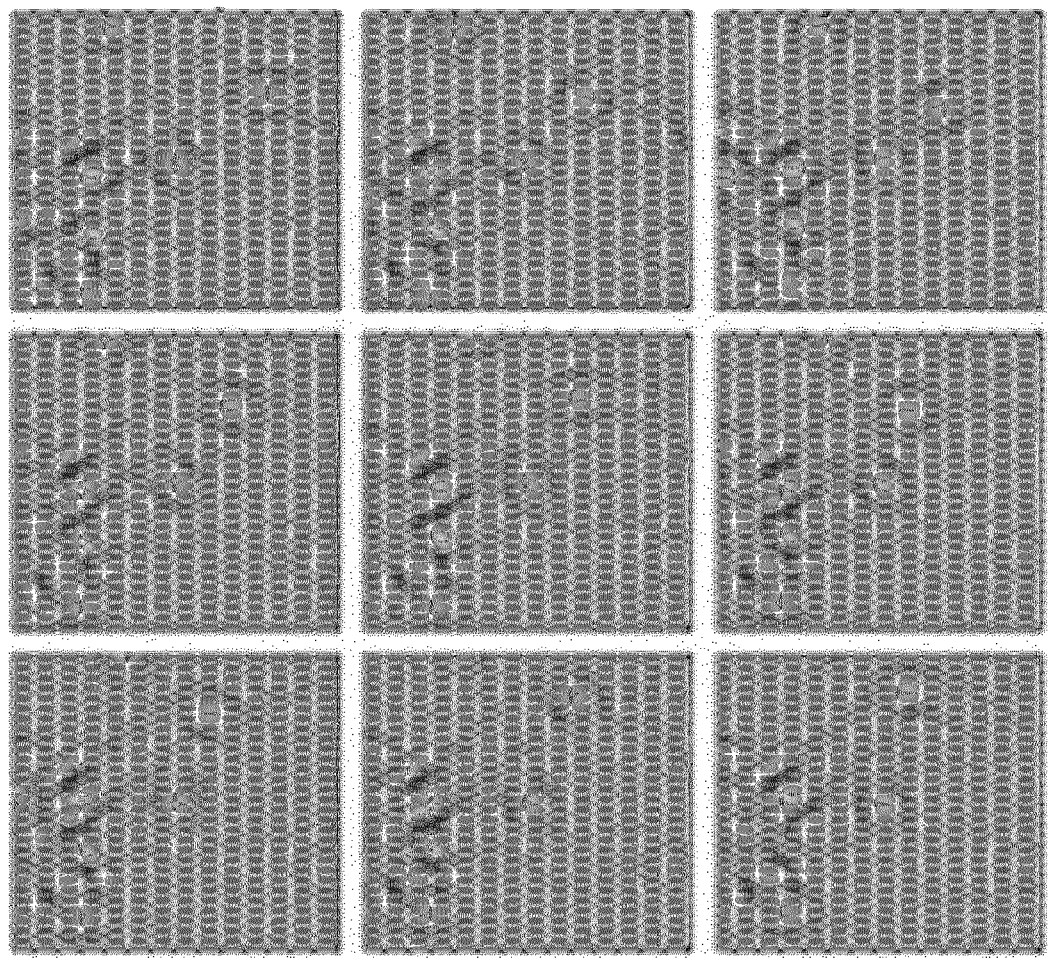

FIG. 6 shows thumbnail images centered on a same sperm cell, the thumbnail images being extracted from a series of nine images acquired according to a defocused imaging modality.

FIGS. 7A, 7B and 7C respectively represent an acquired image, a reference image and an image resulting from the detection neural network.

FIGS. 8A, 8B and 8C respectively represent an acquired image, a reference image and an image resulting from the detection neural network. On this series of images, FIG. 8A has been subjected to processing by a high-pass filter.

Figure 9A:
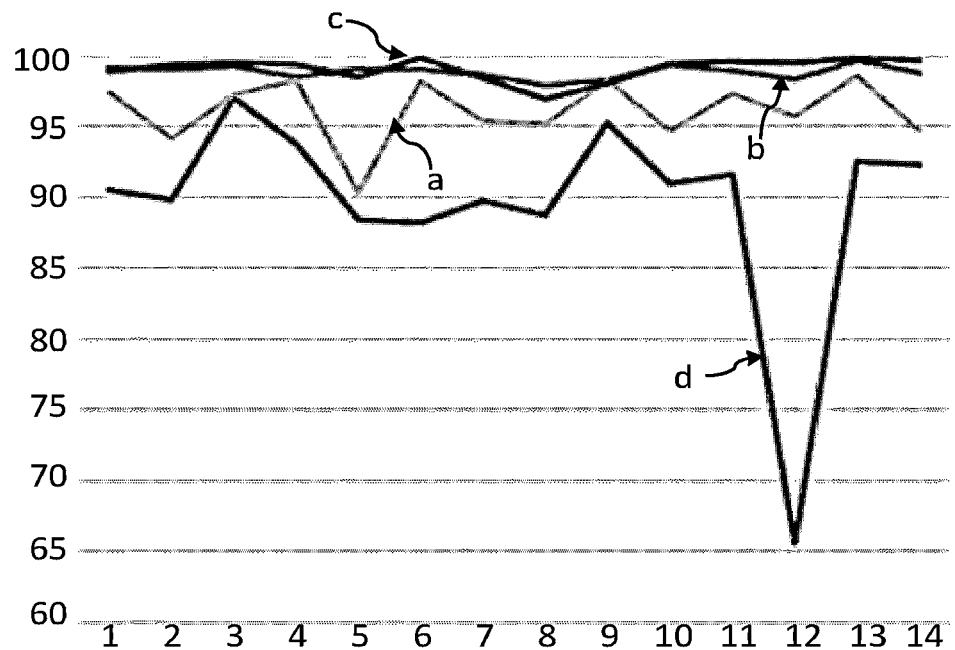
Figure 9B:
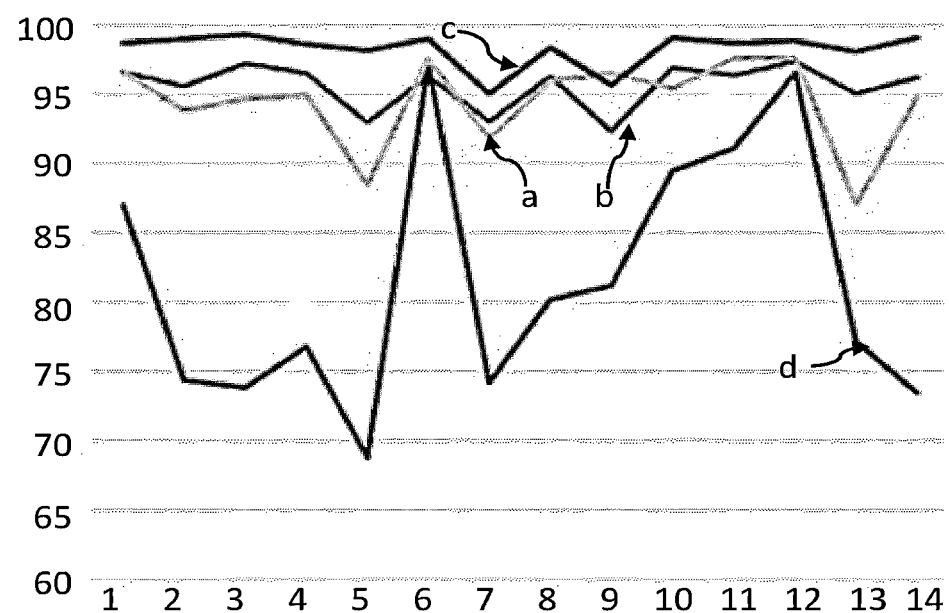

FIGS. 9A and 9B represent particle detection performance levels by the detection neural network, in different conditions. The performance levels are the sensitivity (FIG. 9A) and the specificity (FIG. 9B).

Figure 10A:
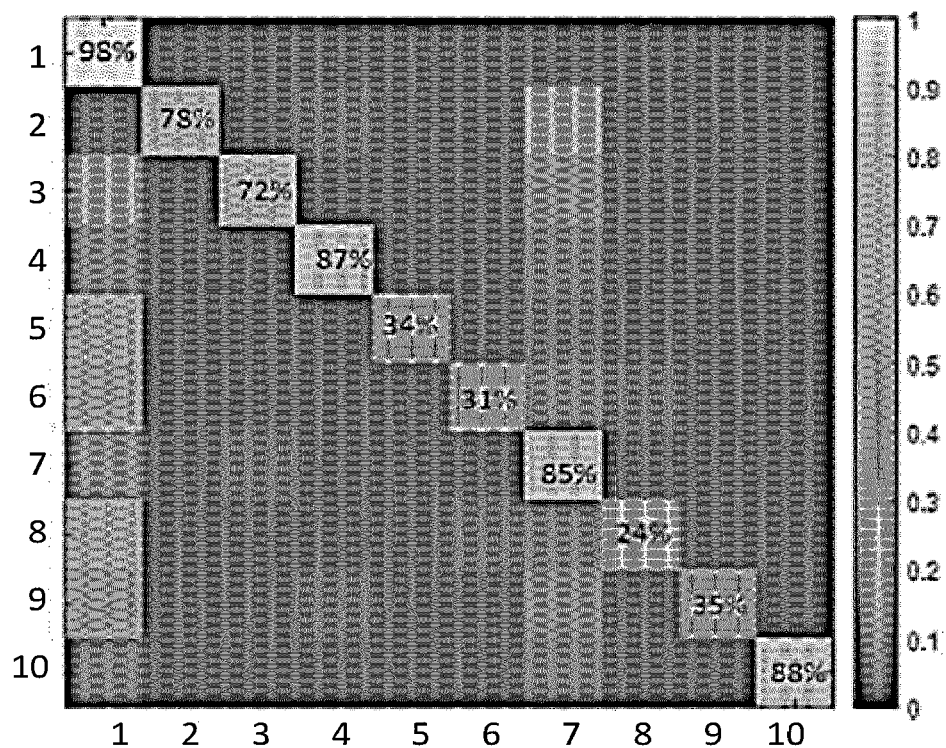
Figure 10B:
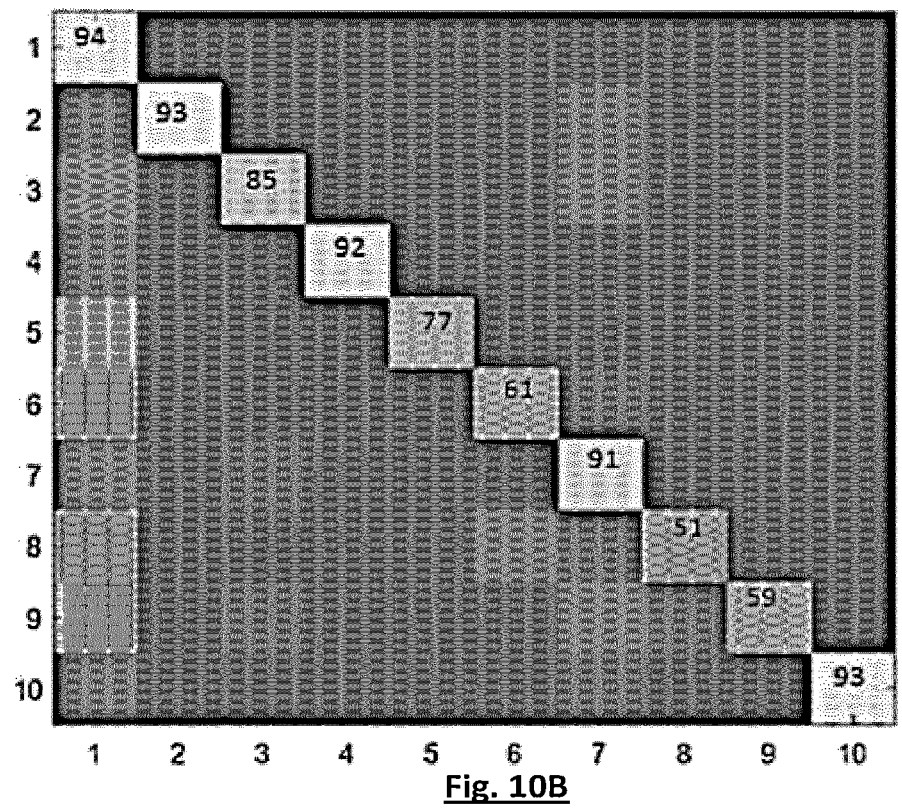
Figure 10C:
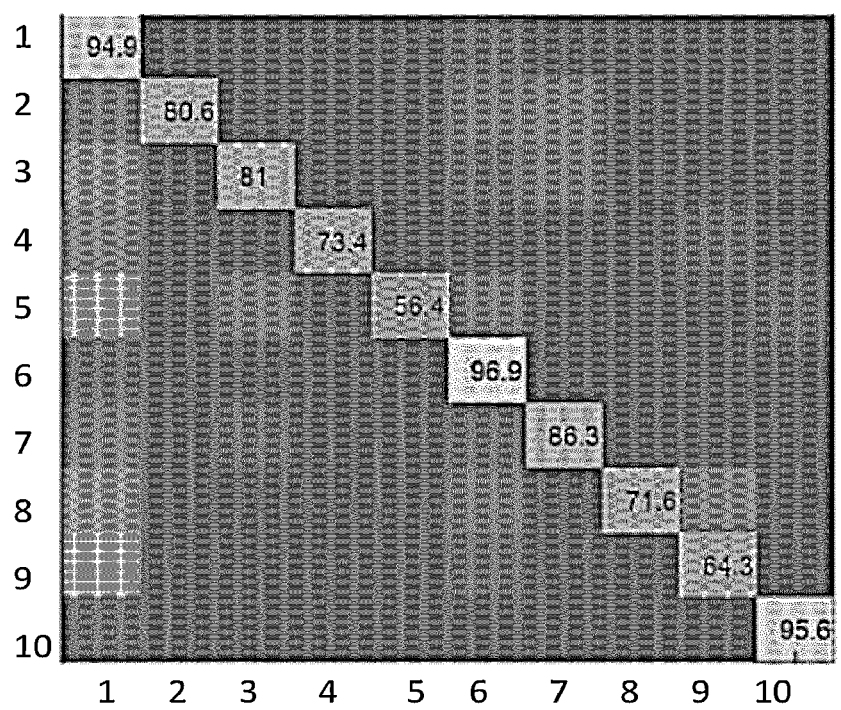

FIGS. 10A to 10C represent confusion matrices, expressing the sperm cell classification performance levels, using images acquired according to the defocused modality, the classification being performed respectively:
- by implementing a holographic reconstruction algorithm from an image obtained by holographic reconstruction and processed by a neural network;
- by implementing a classification neural network at which the input layer comprises a single image acquired according to a defocused configuration, without holographic reconstruction;
- by implementing a classification neural network, of which the input layer comprises a series of images of a particle, each image being acquired according to a defocused configuration, without holographic reconstruction.

EXPLANATION OF PARTICULAR EMBODIMENTS

Figure 1A:
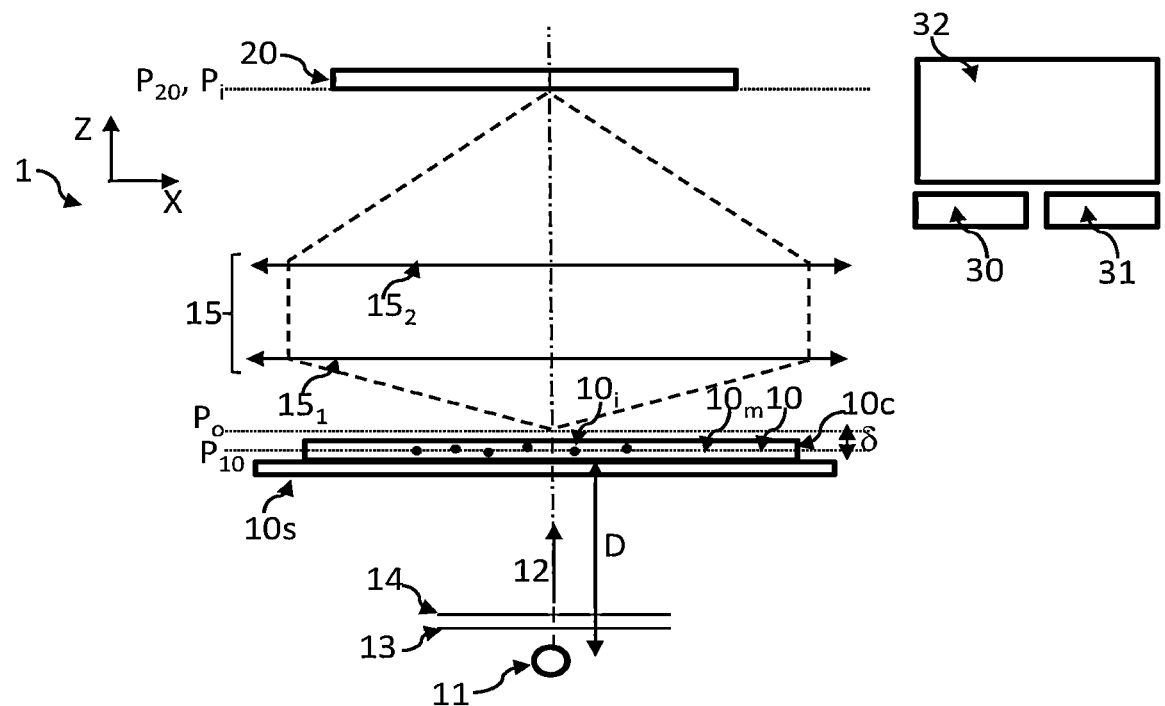
FIG. 1A represents a first embodiment of a device allowing an implementation of the invention.

FIG. 1A shows a first embodiment of a device allowing an implementation of the invention. According to this first embodiment, the device allows the observation of a sample 10 interposed between a light source 11 and an image sensor 20. The light source 11 is configured to emit an incident light wave 12 propagated to the sample parallel to a propagation axis Z.

The device comprises a sample support 10s configured to receive the sample 10, such that the sample is held on the support 10s. The sample thus held extends on a plane, called sample plane $P_{10}$. The sample plane corresponds for example to an average plane around which the sample 10 extends. The sample support can be a glass plate, for example 1 mm thick.

The sample notably comprises a liquid medium $10_m$ in which mobile and possibly motile particles $10_i$ are bathed. The medium $10_m$ can be a biological liquid or a buffer liquid. It can for example comprise a bodily fluid, in the pure or diluted state. Bodily fluid should be understood to mean a liquid generated by a living body. It can in particular be, as a nonlimiting example, blood, urine, cerebrospinal fluid, semen, lymph.

The sample 10 is preferably contained in a fluidic chamber $10_c$. The fluidic chamber is for example a fluidic chamber of a thickness of between 20 µm and 100 µm. The thickness of the fluidic chamber, and therefore of the sample 10, on the propagation axis Z, varies typically between 10 µm and 200 µm, and preferably lies between 20 µm and 50 µm.

One of the objectives of the invention is the characterization of particles in motion in the sample. In the exemplary embodiment described, the mobile particles are sperm cells. In this case, the sample comprises semen, possibly diluted. In this case, the fluidic chamber $10_c$ can be a counting chamber dedicated to analyzing the mobility or the concentration of cells. It may for example be a counting chamber marketed by Leja, of a thickness of between 20 µm and 100 µm.

According to other applications, the sample comprises mobile particles, for example microorganisms, for example microalgae or plankton, or cells, for example cells in the process of sedimentation.

The distance D between the light source 11 and the sample 10 is preferably greater than 1 cm. It is preferably between 2 and 30 cm. Advantageously, the light source 11, seen by the sample, is considered to be a spot source. That means that its diameter (or its diagonal) is preferentially less than a tenth, better a hundredth, of the distance between the sample and the light source.

The light source 11 is for example a light-emitting diode. It is preferably associated with a diaphragm 14, or spatial filter. The aperture of the diaphragm is typically between 5 µm and 1 mm, preferably between 50 µm and 1 mm. In this example, the diaphragm has a diameter of 400 µm. According to another configuration, the diaphragm can be replaced by an optical fiber, a first end of which is placed facing the light source and a second end of which is placed opposite the sample 10. The device can also comprise a diffuser 13, disposed between the light source 13 and the diaphragm 14. The use of a diffuser/diaphragm assembly is for example described in U.S. Pat. No. 10,418,399.

The image sensor 20 is configured to form an image of the sample on a detection plane $P_{20}$. In the example represented, the image sensor 20 comprises a matrix of pixels, of CCD or CMOS type. The detection plane $P_{20}$ preferably extends at right angles to the propagation axis Z. Preferably, the image sensor has a high sensitive surface area, typically greater than 10 mm². In this example, the image sensor is an IDS-UI-3160CP-M-GL sensor comprising pixels of 4.8×4.8 µm², the sensitive surface area being 9.2 mm×5.76 mm, i.e. 53 mm².

In the example represented in FIG. 1A, the image sensor 20 is optically coupled to the sample 10 by an optical system 15. In the example represented, the optical system comprises a lens $15_1$ and a tube lens $15_2$. The latter is intended to project a formed image onto the sensitive surface of the image sensor 20 (surface area of 53 mm²).

In this example:
- the lens $15_1$ is a Motic CCIS EF-N Plan Achromat 10× lens, with a numerical aperture of 0.25;
- the lens $15_2$ is a Thorlabs LBF254-075-A lens with a focal length of 75 mm.

Such a setup gives an observation field of 3 mm², with a spatial resolution of 1 µm. The short focal length of the lens makes it possible to optimize the bulk of the device 1 and to adjust the magnification to the dimension of the image sensor.

The image sensor is configured to acquire images of the sample, according to an acquisition frequency of a few tens of images per second, for example 60 images per second. The sampling frequency is typically between 5 and 100 images per second.

The optical system 15 defines an object plane $P_o$ and an image plane $P_i$. In the embodiment represented in FIG. 1A, the image sensor 20 is configured to acquire an image according to a defocused configuration. The image plane $P_i$ is merged with the detection plane $P_{20}$, while the object plane $P_o$ is offset by an object focusing distance δ of between 10 µm and 500 µm, with respect to the sample. The focusing distance is preferably between 50 µm and 100 µm, for example 70 µm. The object plane $P_o$ extends out of the sample 10. According to another possibility, the object plane extends into the sample, while the image plane is offset with respect to the detection plane, by an image defocusing distance. The image focusing distance is preferably between 50 µm and 100 µm, for example 70 µm. According to another possibility, the object plane $P_o$ and the image plane $P_i$ are both offset respectively with respect to the plane of the sample and with respect to the detection plane. Whatever the configuration retained, the defocusing distance is preferably greater than 10 µm and less than 1 mm, even 500 µm, and preferably between 50 µm and 150 µm. The observation of a cellular sample according to a defocused configuration has been described in the patent U.S. Pat. No. 10,545,329.

According to such a modality, the image sensor 20 is exposed to a light wave, called exposure light wave. The image acquired by the image sensor comprises interference figures, that can also be referred to by the term "diffraction figures", formed by:

a portion of the light wave 12 emitted by the light source 11, and having passed through the sample without interacting therewith;

diffraction waves, formed by the diffraction of a portion of the light wave 12 emitted by the light source in the sample. The diffraction is notably that formed by the particles.

A processing unit 30, comprising a microprocessor for example, is able to process each image acquired by the image sensor 20. In particular, the processing unit comprises a programmable memory 31 in which is stored a sequence of instructions for performing the image processing and computation operations described in this description. The processing unit 30 can be coupled to a screen 32 allowing the display of images acquired by the image sensor 20 or resulting from the processing performed by the processing unit 30.

The image acquired by the image sensor 20, according to a defocused imaging modality, is a diffraction figure of the sample, sometimes called hologram. It does not make it possible to obtain an accurate representation of the observed sample. Usually in the field of holography, it is possible to apply, to each image acquired by the image sensor, a holographic reconstruction operator so as to calculate a complex expression representative of the light wave to which the image sensor is exposed, and that can be done at any point of coordinates (x, y, z) of the space, and in particular in a reconstruction plane corresponding to the plane of the sample. The complex expression makes it possible to obtain the intensity or the phase of the exposure light wave. Such a holographic reconstruction is described in association with the prior art, and in U.S. Pat. No. 10,545,329.

However, for processing speed reasons, the inventors have followed an approach that differs from that suggested by the prior art, without recourse to a holographic reconstruction algorithm applied to the images acquired by the image sensor. The method implemented by the sensor is described hereinbelow, in association with FIG. 3.

Figure 1B:
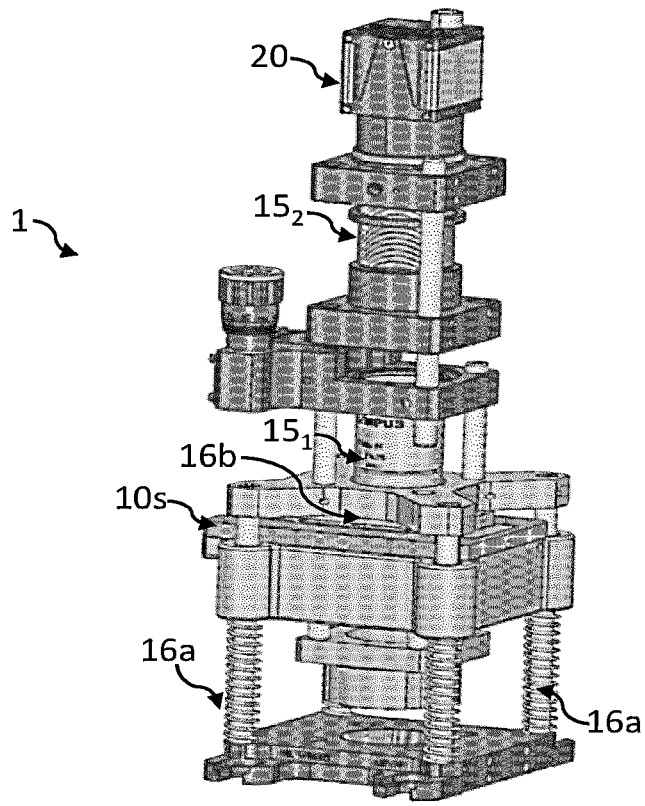
FIG. 1B is a three-dimensional view of the device schematically represented in FIG. 1A.
Figure 1C:
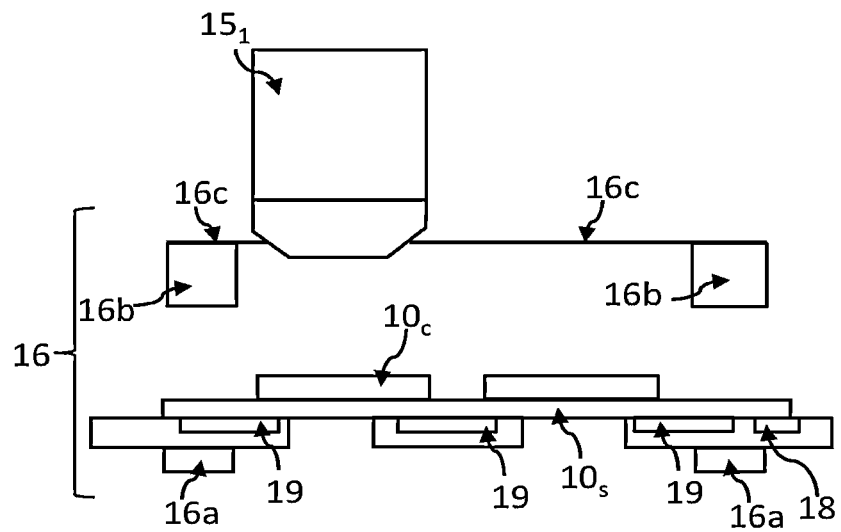
FIG. 1C shows a setup making it possible to maintain the sample at a fixed distance from an optical system.
Figure 1D:
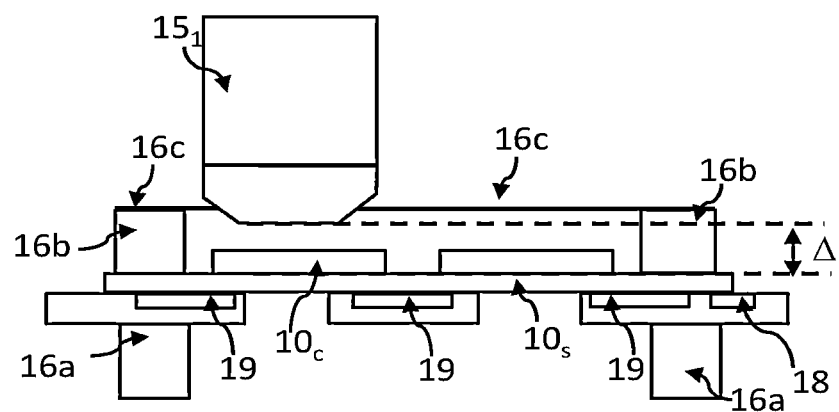
FIG. 1D shows the setup represented in FIG. 1C in a position of observation.

FIG. 1B is a representation of an example of device as schematically represented in FIG. 1A. FIGS. 1C and 1D represent a detail of the arrangement of the sample 10 facing the optical system 15, and more specifically facing the lens 15$_1$. The support of the sample 10$_s$ is linked to elastic return means 16$_a$, for example springs. The springs tend to bring the sample support 10$_s$ closer to the lens 15$_1$. The device also comprises stops 16$_b$, secured to the lens 15$_1$. The lens 15$_1$ and the stops 16$_b$ are fixed with respect to the image sensor 20. The stops 16$_b$ and the return means 16$_a$ form a holding structure 16, intended to hold the sample between the light source 11 and the image sensor 20.

FIGS. 1C and 1D represent the holding of the sample on the sample support respectively during the placement of the sample and during the observation thereof. A rigid link 16$_c$ links the lens 15$_1$ to the stop 16$_b$. During the placement of the sample (FIG. 1C), the springs 16$_a$ are compressed. During the observation of the sample (FIG. 1D), under the effect of an expansion of the springs 16$_a$, the support of the sample 10$_s$ comes to bear against the stops 16$_b$. That makes it possible to control the distance Δ between the lens 15$_1$ and the sample 10, independently of the thickness of the sample support 10$_s$. That makes it possible to overcome variations of the thickness of the sample support. For example, when the latter is a glass plate 1 mm thick, the thickness can fluctuate by a relatively significant range, for example ±100 μm. The setup described in association with FIGS. 1C and 1D makes it possible to control the distance Δ between the lens 15$_1$ and the sample 10, to within ±5 μm, independently of such fluctuations of thickness of the plate 10$_s$. The inventors estimate that such a setup makes it possible to avoid recourse to an autofocus system for taking images.

In FIGS. 1C and 1D, also represented is a heating resistor 19 linked to a temperature controller 18. The function of these elements is to maintain a temperature of the fluidic chamber 10$_c$ at 37° C.

Figure 2:
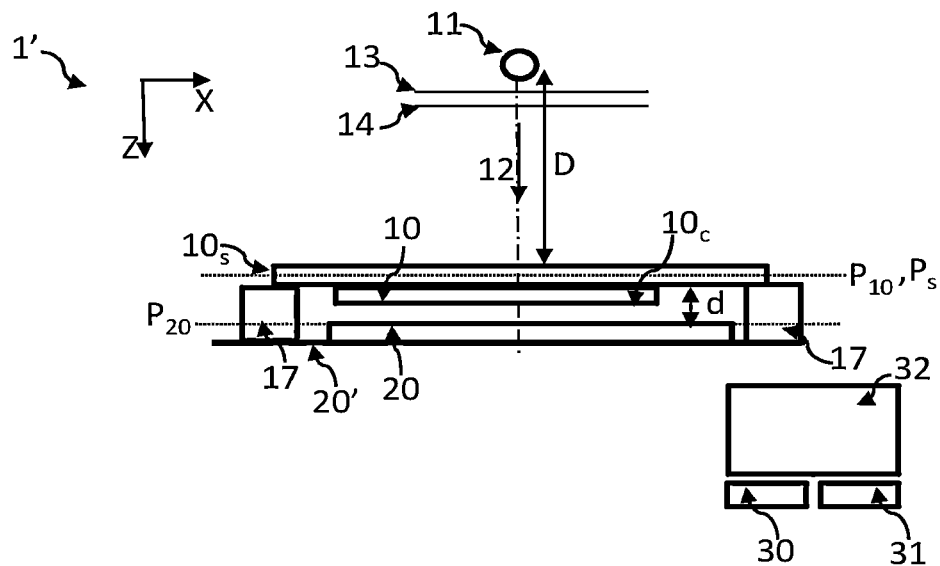
FIG. 2 represents a second embodiment of a device allowing an implementation of the invention.

FIG. 2 represents a second embodiment of the device 1' suitable for the implementation of the invention. The device 1' comprises a light source 11, a diffuser 13, a diaphragm 14, an image sensor 20, a holding structure 17 and a processing unit 30 as described in association with the first embodiment. The holding structure 17 is configured to define a fixed distance between the sample and the image sensor. According to this embodiment, the device does not include an image-forming lens between the image sensor 20 and the sample 10. The image sensor 20 is preferably brought close to the sample, the distance between the image sensor 20 and the sample 10 being typically between 100 μm and 3 mm. According to this embodiment, the image sensor acquires images according to a lensless imaging modality. The sample is preferably contained in a fluidic chamber 10$_c$, for example a "Leja" chamber as described in association with the first embodiment. The advantage of such an embodiment is that it does not require a precise positioning of an optical system 15 with respect to the sample 10, and that it gives a high observation field. The drawback is that the images obtained are of lesser quality, but remain usable.

Preferably, the holding structure is arranged such that the distance between the sample, when the sample 10 is disposed on the holding structure 17, and the image sensor 20, is constant. In the example represented in FIG. 2, the holding structure 17 is linked to a base 20', on which the image sensor 20 extends. The base can for example be a plate of PCB (printed circuit board) type, on which the image sensor 20 is placed. The sample 10, contained in the fluidic chamber 10$_c$, is held, by the sample support 10$_s$, on the holding structure 17. The sample support is, for example, a transparent plate. The sample extends between the sample support 10$_s$ and the image sensor. Thus, the distance between the sample 10 and the image sensor 20 is not affected by a fluctuation of the thickness of the support 10$s$.

Figure 3:
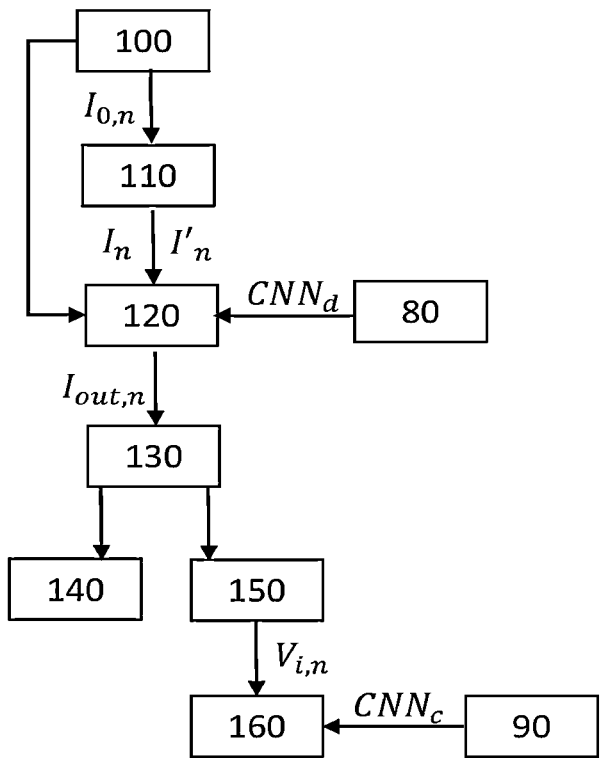
FIG. 3 shows the main steps of a method for characterizing mobile particles in the sample.

FIG. 3 schematically represents the main steps of a method for processing several images acquired by an image sensor according to the defocused imaging modality (first embodiment) or lensless imaging modality (second embodiment). The method is described in association with the observation of sperm cells, it being understood that it can be applied to the observation of other types of motile particles.

Step 100: Acquisition of a Series of Images $I_{0,n}$

During this step, a series of images $I_{0,n}$ is acquired according to one of the modalities previously described. n is a natural integer designating the rank of each image acquired, with 1≤n≤N, N being the total number of images acquired. The images acquired are images acquired either according to a defocused imaging modality or according to a lensless imaging modality. The number N of images acquired can be between 5 and 50. As previously indicated, the images can be acquired according to an acquisition frequency of 60 Hz.

In the results presented hereinbelow, the images were acquired by using a defocused imaging modality, as described in association with FIGS. 1A to 1D.

Step 110: Preprocessing

The aim is to perform a preprocessing of each image acquired, so as to limit the effects of a fluctuation of the intensity of the incident light wave or of the sensitivity of the camera.

The preprocessing consists in normalizing each image acquired by an average of the intensity of at least one image acquired, and preferably all of the images acquired.

Thus, from each image $I_{0,n}$, the normalization makes it possible to obtain a normalized image $I_n$, such that $$I_n = \frac{I_{0,n}}{\overline{I_{0,n}}} \text{ or } I_n = \frac{I_{0,n}}{\overline{I_{0,n}}} \times 100$$

in which $\overline{I_{0,n}}$ is an average of one or more images of the series of images, and preferably of each image of the series of images.

According to one possibility, the preprocessing can include an application of a high-pass filter to each image, possibly normalized. The high-pass filter makes it possible to eliminate the low frequencies of the image.

According to one possibility, a Gaussian filter is applied, by effecting a product of convolution of the image $I_n$ by a Gaussian kernel K. The width at mid-height of the Gaussian kernel is for example 20 pixels. The preprocessing then consists in subtracting, from the image $I_n$, the image $I_n*K$ resulting from the application of the Gaussian filter, such that the image resulting from the preprocessing is: $I'_n = I_n - I_n*K$. * is the convolution product operator.

The effect of such a filtering is described hereinbelow, in association with FIGS. 7A to 7C and 8A to 8C.

Step 120: Detection of Particles

This step consists in detecting and in accurately positioning the sperm cells, and doing so on each image $I_{0,n}$, resulting from the step 100 or of each image $I'_n$ preprocessed in the step 110. This step is performed using a detection convolutional neural network $CNN_d$. The neural network $CNN_d$ comprises an input layer, in the form of an input image $I_{in,n}$. The input image $I_{in,n}$ is either an acquired image $I_{0,n}$, or a preprocessed image $I_n$, $I'_n$. From the input image $I_{in,n}$, the detection neural network $CNN_d$ generates an output image $I_{out,n}$. The output image $I_{out,n}$ is such that each sperm cell $10_i$ detected on the input image $I_{in,n}$, in a position $(x_i, y_i)$, appears in the form of a distribution of intensity centered around said position. In other words, from an input image $I_{in,n}$, the neural network $CNN_d$ allows:

a detection of sperm cells;

an estimation of the position $(x_i, y_i)$ of each detected sperm cell $10_i$;

a generation of an output image $I_{out,n}$ comprising a distribution of intensity $D_i$ predetermined around each position $(x_i, y_i)$.

Thus, $I_{out,n} = CNN_d(I_{in,n})$

Each position $(x_i, y_i)$ is a two-dimensional position, in the detection plane $P_{20}$. The distribution of intensity $D_i$ is such that the intensity is maximal at each position $(x_i, y_i)$ and that the intensity is considered negligible beyond a vicinity $V_i$ of each position. Vicinity $V_i$ is understood to mean a region extending according to a number of pixels, predetermined, for example between 5 and 20 pixels, around each position $(x_i, y_i)$. The distribution $D_i$ can be of strobe type in which case, in the vicinity $V_i$, each pixel is of constant intensity is high, and beyond the vicinity $V_i$, each pixel has a zero intensity.

Preferably, the distribution $D_i$ is centered on each position $(x_i, y_i)$ and is strictly decreasing around the latter. It can for example be a two-dimensional Gaussian intensity distribution, centered on each position $(x_i, y_i)$. The width at mid-height is for example less than 20 pixels, and preferably less than 10 or 5 pixels. Any other form of parametric distribution can be envisaged, bearing in mind that it is preferable for the distribution $D_i$ to be symmetrical around each position, and preferably strictly decreasing from the position $(x_i, y_i)$. The fact of assigning an intensity distribution $D_i$ to each position $(x_i, y_i)$ makes it possible to obtain an output image $I_{out,n}$ in which each sperm cell is simple to detect. In that, the output image $I_{out,n}$ is a detection image, on the basis of which each sperm cell can be detected.

The output image from the neural network is formed by a resultant of each intensity distribution $D_i$ defined respectively around each position $(x_i, y_i)$.

In the example implemented by the inventors, the detection convolutional neural network comprised 20 layers comprising either 10 or 32 characteristics (more usually referred to as "features") per layer. The number of features was determined empirically. The transition from one layer to another is performed by applying a convolution kernel of 3×3 size. The output image is obtained by combining the features of the last convolution layer. The neural network was programmed in a Matlab environment (Matlab publisher: The Mathworks). The neural network was previously subjected to learning (step 80), so as to parameterize the convolution filters. During the learning, learning sets were used, each set comprising:

an input image, obtained by the image sensor and preprocessed by normalization and possibly filtering, by using animal semen, an output image, on which the position of each sperm cell was annotated manually.

The learning was performed by using 10 000 or 20 000 annotated positions (i.e. between 1000 and 3000 annotated positions per image). The effect of the size of the learning set (10 000 or 20 000 annotations) is discussed in association with FIGS. 9A and 9B.

FIGS. 4A, 4B and 4C are a set of test images, respectively comprising:

an image of a sample of bovine semen acquired by the image sensor and having been subjected to a normalization and high-pass filtering according to the step 110;

a manually annotated image, which corresponds to a reference image, usually designated by the term "ground truth";

an image resulting from the application of the detection convolutional neural network.

The image of FIG. 4C is consistent with the reference image (FIG. 4B) which affirms the detection performance of the neural network $CNN_d$. The inventors have noted that FIG. 4C shows a position not represented on the reference image: a check showed that it was due to an annotation being forgotten on the reference image.

Thus, on the basis of a hologram, and through possible preprocessings of normalization or high-pass filter type, to reveal the high frequencies, the application of the detection convolutional neural network $CNN_d$ allows a detection and an accurate positioning of sperm cells. And does so without recourse to an image reconstruction implementing a holographic propagation operator, as suggested in the prior art. The input image of the neural network is an image formed in the detection plane, and not in a reconstruction plane remote from the detection plane. Furthermore, the detection neural network generates output images with little noise: the signal-to-noise ratio associated with each sperm cell detection is high, which facilitates the subsequent operations.

The step 120 is reiterated for different images of a same series of images, so as to obtain an output series of images $I_{out,1} \ldots I_{out,N}$.

During the step 120, from each output image $I_{out,1} \ldots I_{out,N}$, a local maximum detection algorithm is applied, so as to obtain, for each image, a list of 2D coordinates, each coordinate corresponding to a position of a sperm cell. Thus, from each output image $I_{out,1} \ldots I_{out,N}$, a list $L_{out,1} \ldots L_{out,N}$ is established. Each list $L_{out,n}$ comprises corresponds to the positions 2D, in the detection plane, of sperm cells detected in an image $I_{out\ out,n}$.

FIG. 5A represents an image acquired in the step 100. More specifically, it is a detail of an image acquired according to a defocused modality. It is an image of a sample comprising bovine sperm. Such an image is difficult to interpret by a user. FIG. 5B shows an image resulting from the application of the detection neural network to FIG. 5A, after normalization and application of a high-pass filter. The comparison between the images 5A and 5B shows the gain provided by the detection convolutional neural network in terms of signal-to-noise ratio.

Step 130: Position Tracking

During this step, from the lists $L_{out,1} \ldots L_{out,N}$ respectively established from the output images $I_{out,1} \ldots I_{out,N}$, resulting from a same series of images $I_{0,1} \ldots I_{0,N}$, a position tracking algorithm is applied, normally referred to as "tracking algorithm". For each sperm cell detected following the step 120, an algorithm is implemented that allows the position of the sperm cell to be tracked, parallel to the detection plane, between the different images of the series of images. The implementation of the position tracking algorithm is efficient because it is performed from the lists $L_{out,1} \ldots L_{out,N}$ resulting from the step 120. As previously indicated, these images have a high signal-to-noise ratio, which facilitates the implementation of the position tracking algorithm. The position tracking algorithm can be an algorithm of "closest neighbor" type. The step 130 allows a determination of a trajectory of each sperm cell parallel to the detection plane.

In FIG. 5C, output images $I_{out,1} \ldots I_{out,N}$ have been superposed by considering a stack of images of 30 images. It can be seen that the trajectory, parallel to the detection plane, of each sperm cell, can be determined precisely.

Step 140: Characterization of Motility

During the step 140, for each sperm cell, each trajectory can be characterized on the basis of metrics applied to the trajectories resulting from the step 130. Knowing the image acquisition frequency, it is possible to quantify the speeds of displacement of each sperm cell detected, and in particular:

a linear trajectory speed VSL, usually referred to as "velocity straightline path", which corresponds to the speed calculated on the basis of a distance, in a straight line, between the first and last points of the trajectory (the first point is determined from the first acquired image of the series of images, and the last point is determined from the last acquired image of the series of images), a curvilinear trajectory speed VCL, usually referred to as "velocity curvilinear path": this is a speed established by aggregating the distances traveled between each image, and by dividing by the duration of the acquisition period;

an average trajectory speed VAP, usually referred to as "velocity average path": this is a speed established after smoothing of the trajectory of a particle: the distance traveled according to the smoothed trajectory (or average trajectory) is divided by the duration of the acquisition period.

From the calculated speeds, it is possible to define indicators making it possible to characterize the motility of the sperm cells that are known to the person skilled in the art. These are for example indicators of the following types:

straightness indicator STR, obtained by a ratio between VSL and VAP, usually referred to as "straightness". This indicator is all the higher when the sperm cell moves in a straight line;

linearity indicator LIN, obtained by a ratio between VSL and VCL, usually referred to as "linearity". This indicator is also all the higher when the sperm cell moves in a straight line;

wobble indicator WOB, obtained by a VAP/VCL ratio, usually referred to as wobble.

The quantification of the speeds or parameters listed above makes it possible to categorize the sperm cells according to their motility. For example, a sperm cell is considered as:

motile if the length of the trajectory is greater than a first threshold, for example 10 pixels, and its movement along the average trajectory (VAP×Δt, Δt being the acquisition period) is greater than a predefined length, for example corresponding to the length of a sperm cell head;

progressive if the length of the trajectory is greater than the first threshold, and if the straightness STR and the average trajectory speed VAP are respectively greater than two threshold values $STR_{th}$ and $VAP_{th1}$, slow if the length of the trajectory is greater than the first threshold and if the linear trajectory speed VSL and the average trajectory speed VAP are respectively less than two threshold values $VSL_{th2}$ and $VAP_{th2}$;

static if the length of the trajectory is greater than the first threshold and if the linear trajectory speed VSL and the average trajectory speed VAP are respectively less than two threshold values $VSL_{th3}$ and $VAP_{th3}$;

not categorized if the length of the trajectory is less than the first threshold.

The threshold values $STR_{th}$, $VSL_{th2}$, $VSL_{th3}$ are previously determined, with $VSL_{th2} \geq VSL_{th3}$. The same applies for the values $VAP_{th1}$, $VAP_{th2}$ and $VAP_{th3}$ with $VAP_{th1} \geq VAP_{th1} \geq VAP_{th3}$.

Step 150: Extraction of Thumbnail Images for Each Sperm Cell

During this image, for each sperm cell detected by the neural network $CNN_d$, a thumbnail image $V_{i,n}$ extracted, and from each image $I_{0,n}$ acquired by the image sensor in the step 100.

Each thumbnail image $V_{i,n}$ is a portion of an image $I_{0,n}$ acquired by the image sensor. For each detected sperm cell $10_i$, from each image $I_{0,n}$, a thumbnail image $V_{i,n}$ is extracted around the position $(x_i, y_i)$ assigned to the sperm cell. The position $(x_i, y_i)$ of the sperm cell $10_i$, in each image $I_{0,n}$, is obtained following the implementation of the position tracking algorithm (step 130).

The size of each thumbnail image $V_{i,n}$ is predetermined. Relative to each thumbnail image $V_{i,n}$, the position $(x_i, y_i)$ of the sperm cell $10_i$ considered is fixed: preferably, the position $(x_i, y_i)$ of the sperm cell $10_i$ is centered in each thumbnail image $V_{i,n}$.

A thumbnail image $V_{i,n}$ can for example comprise several tens or even hundreds of pixels, typically between 50 and 500 pixels. In this example, a thumbnail image comprises 64×64 pixels. Because of the size, and of the concentration of the sperm cells in the sample, a thumbnail image $V_{i,n}$ can include several sperm cells to be characterized. However, only the sperm cell $10_i$ occupying a predetermined position in the thumbnail image $V_{i,n}$, for example at the center of the thumbnail image, is characterized by using said thumbnail image.

FIG. 6 shows nine thumbnail images $V_{i,n}$ extracted from images $I_{out,n}$ resulting from the step 100, by using the positions $(x_i, y_i)$ resulting from the sperm cell trajectory tracking resulting from the step 130.

Step 160: Classification of the Morphology of Each Sperm Cell

During this step, a classification neural network $CNN_c$ is used, so as to classify each sperm cell $10_i$ previously detected by the detection convolutional neural network $CNN_d$. For each sperm cell $10_i$, the neural network is fed by the thumbnail images $V_{i,1} \ldots V_{i,N}$ extracted in the step 150.

The classification convolutional neural network $CNN_c$ can for example comprise 6 convolutional layers, comprising between 16 and 64 features: 16 features for the four first layers, 32 features for the fifth layer, and 64 features for the sixth layer. The transition from one layer to another is performed by applying a convolution kernel of 3 by 3 size. The output layer comprises nodes, each node corresponding to a probability of belonging to a morphological class. Each morphological class corresponds to a morphology of the sperm cell being analyzed. It can for example be a known classification, the classes being:

0: undefined
1: normal
2: stump
3: distal droplet
4: decapitated
5: microcephalic
6: proximal droplet
7: DMR (distal midpiece reflex, usually referred to as curvature of the distal end of the midpiece)
8: head anomaly
9: tail anomaly: tail curved or wound
10: aggregates.

The output layer can thus include 11 classes.

The neural network is programmed in the Matlab environment (Matlab publisher: The Mathworks). The neural network was previously subjected to a learning (step 90), so as to parameterize the convolution filters. During the learning, learning sets were used, each set comprising:

thumbnail images, extracted from images acquired by the image sensor;
a manual annotation of the morphology of each sperm cell analyzed. The annotation was done on the basis of thumbnail images having been subjected to a holographic reconstruction.

Experimental Tests

Different tests were carried out to examine the performance levels of the detection neural network $CNN_d$. The sensitivity of the detection was tested with respect to the application of a high-pass filter during the step 110. FIGS. 7A, 7B and 7C respectively represent an image acquired by the image sensor, a reference image, annotated manually, and an image resulting from the detection neural network. The image 7C was obtained without implementation of the filter during the step 110.

FIGS. 8A, 8B and 8C respectively represent an image acquired by the image sensor, a reference image, annotated manually, and an image resulting from the detection neural network. The image 8C was obtained by implementing a high-pass filter during the step 110.

It can be seen that the image 8C includes detected sperm cells, identified by arrows, which do not appear on the image 7C. The application of the filter enhances the detection efficiency of the classification neural network.

FIGS. 9A and 9B respectively represent the detection sensitivity and the detection specificity of the detection neural network $CNN_d$ (curves a, b and c), compared to a conventional algorithm (curve d). The conventional algorithm was based on image processing morphological operations of erosion/expansion type.

On each of the FIGS. 9A and 9B, the curves a, b and c correspond respectively:

to the neural network trained with 10 000 annotations;
to the neural network trained with 20 000 annotations;
to the neural network trained with 20 000 annotations, each image acquired by the sensor having been subjected to a high-pass filtering.

The sensitivity and the specificity (ordinate axes) were determined on 14 different samples (abscissa axis) of diluted bovine semen (factor 10). It can be seen that the performance levels of the neural network, whatever the configuration (curves a, b and c), are greater than that of the conventional algorithm, which is noteworthy. Moreover, the best performance is obtained in the configuration c, according to which the neural network is trained with 20 000 annotations and is fed with an image having been subjected to a preprocessing with a high-pass filter.

It will be recalled that the sensitivity corresponds to the ratio of true positives to the sum of the ratios of true positives and false negatives, and that the specificity corresponds to the ratio of true positives to the sum of the ratios of true and false positives.

FIG. 10A is a confusion matrix representing the classification performance levels of a classification neural network $CNN_c$ parameterized to receive, as input image, an image resulting from a holographic reconstruction. The neural network is a convolutional neural network, as previously described, trained using images acquired using a defocused device, as previously described. By using this neural network, each image acquired is the subject of a holographic reconstruction in a sample plane extending through the sample, by using a holographic reconstruction algorithm as described in US20190101484. From the reconstructed image, a thumbnail image is extracted that is centered on the sperm cell to be characterized. The thumbnail image forms an input image of the neural network.

FIG. 10B is a confusion matrix representing the classification performance levels of a classification neural network parameterized to receive, as input image, a single thumbnail image, centered on the sperm cell to be characterized, and extracted from an image acquired according to a defocused configuration. The neural network is a convolutional neural network, structured as described in the step 160, except that the neural network is fed by a single thumbnail image.

FIG. 10C is a confusion matrix representing the classification performance levels of a classification neural network as described in the step 160, fed by a series of 5 thumbnail images extracted from images acquired in defocused configuration.

The axes of each confusion matrix correspond to the classes 1 to 10 previously described.

Note that the classification performance levels of the algorithms described in association with FIGS. 10B and 10C are greater than that described in FIG. 10A. For example, regarding the class 6 ("proximal droplet" anomaly), the classification performance level goes from 31% (FIG. 10A), to 61% (FIG. 10B), and to 96.9% (FIG. 10C).

Note also that a single input image makes it possible to obtain a satisfactory classification performance level. So, for a morphological classification, there is no need to have a series of images comprising several images. A single image can suffice. However, the classification performance level is better when several images are used.

The invention allows an analysis of a sample including sperm cells without recourse to a translation plate. Moreover, it allows a characterization directly from the image acquired by the image sensor, that is to say on the basis of diffraction figures of the different sperm cells, and without requiring recourse to numerical reconstruction algorithms. Currently, the recourse to such an algorithm is reflected by a processing time of 10 seconds per image. In other words 300 seconds for a series of 30 images. Moreover, as represented in FIGS. 10A to 10C, the invention allows a more accurate classification than a classification based on a neural network of identical structure, fed by reconstructed images.

Another advantage of the invention is the tolerance with respect to a defocusing. The inventors estimate that the invention tolerates offsets of ±25 μm between the optical system and the sample.

The invention claimed is:

1. A method for characterizing at least one mobile particle in a sample, the method comprising:
    acquiring at least one image of the sample during an acquisition period, using an image sensor, and forming a series of images, the series of images comprising the at least one image, each image of the sample in the series of images being acquired according to a defocused imaging modality or according to a lensless imaging modality, such that each mobile particle forms, on each image, a diffraction figure;
    applying each image of the series of images as an input image to a detection convolutional neural network (CNN), the detection CNN being configured to detect each of the particles, and to produce, from each input image, an output image on which each detected particle has a respective distribution of intensity centered on a position of the detected particle and extending around the position of the detected particle, wherein the particle is a sperm cell;
    for each detected particle, from each output image output from the detection CNN, estimating the position of the detected particle in the output image by analyzing the output image; and
    characterizing each detected particle based on the estimated position obtained from each image of the series of images input to the detection CNN,
    wherein the characterizing step further comprises morphologically characterizing each detected sperm cell by:
    for each detected sperm cell, from each acquired image, and from the estimated positions of the detected sperm cell, extracting a thumbnail image comprising the detected sperm cell, the position of the detected sperm cell in the thumbnail image being predetermined, so as to obtain, for a detected sperm cell, a series of thumbnail images, a size of each thumbnail image being less than a size of each acquired image; and
    for each detected sperm cell, applying the series of thumbnail images as input data to a classification neural network, the classification neural network being configured to classify the sperm cell from among predetermined morphological classes.

2. The method as claimed in claim 1, wherein each detected sperm cell is centered with respect to each thumbnail image.

3. The method as claimed in claim 1, wherein the characterizing step comprises characterizing a motility of the sperm cell, by, from the estimated positions of the sperm cell:
    determining a trajectory of the sperm cell during the acquisition period;
    calculating a speed of the sperm cell from the determined trajectory; and
    classifying the sperm cell as a function of the calculated speed.

4. The method as claimed in claim 3, further comprising:
    determining a distance, in a straight line, between a first point and a last point of the trajectory, and calculating a linear trajectory speed from the determined distance; and/or
    determining distances traveled between each acquired image, and calculating a curvilinear trajectory speed from the determined distances; and/or
    determining a smoothed trajectory, and calculating an average trajectory speed from the smoothed trajectory.

5. The method as claimed in claim 1, wherein:
    the sample extends on a plane of the sample;
    the image sensor extends on a detection plane;
    an optical system extends between the sample and the image sensor, the optical system defining an object plane and an image plane;
    the object plane is offset with respect to the plane of the sample by an object defocusing distance and/or the image plane is offset with respect to the plane of the sample by an image defocusing distance, such that, in the acquiring step, each image of the sample is acquired according to a defocused imaging modality.

6. The method as claimed in claim 5, wherein:
    the sample is disposed on a sample support, resting on a spring, the spring being configured to push the sample support toward the optical system; and
    the optical system is linked to a stop, extending, from the optical system, toward the sample support such that, during the acquiring step, under an effect of the spring, the sample support is pressed onto the stop.

7. The method as claimed in claim 1, wherein no image-forming optic extends between the sample and the image sensor, such that, in the acquiring step, each image of the sample is acquired according to a lensless imaging modality.

8. The method as claimed in claim 1, wherein the acquiring step further comprises normalizing each acquired image by an average of said image or by an average of images of the series of images.

9. The method as claimed in claim 1, wherein the acquiring step further comprises applying a high-pass filter to each acquired image.

10. The method as claimed in claim 1, wherein the distribution of intensity of each particle in the output image is decreasing, such that the intensity decreases as a function of a distance with respect to a center of the particle.

11. The method as claimed in claim 1, wherein the distribution of intensity of each particle in the output image is a two-dimensional parametric statistical distribution.

12. The method of claim 1, wherein the distribution of intensity of each particle in the output image is symmetrical around a center of the particle.

13. A device for observing a sample, the sample comprising mobile particles, the device comprising:
a light source configured to illuminate the sample;
an image sensor configured to form an image of the sample;
a holding structure configured to hold the sample between the light source and the image sensor; and
processing circuitry, linked to the image sensor, and configured to
acquire at least one image of the sample during an acquisition period, using an image sensor, and forming a series of images, the series of images comprising the at least one image, each image of the sample in the series of images being acquired according to a defocused imaging modality or according to a lensless imaging modality, such that each mobile particle forms, on each image, a diffraction figure;
apply each image of the series of images as an input image to a detection convolutional neural network (CNN), the detection CNN being configured to detect each of the particles, and to produce, from each input image, an output image on which each detected particle has a respective distribution of intensity centered on a position of the detected particle and extending around the position of the detected particle, wherein the particle is a sperm cell;
for each detected particle, from each output image output from the detection CNN, estimate the position of the detected particle in the output image by analyzing the output image; and
characterize each detected particle based on the estimated position obtained from each image of the series of images input to the detection CNN,
wherein the processing circuitry is further configured to, in the characterizing step, further morphologically characterize each detected sperm cell by:
for each detected sperm cell, from each acquired image, and from the estimated positions of the detected sperm cell, extracting a thumbnail image comprising the detected sperm cell, the position of the detected sperm cell in the thumbnail image being predetermined, so as to obtain, for a detected sperm cell, a series of thumbnail images, a size of each thumbnail image being less than a size of each acquired image; and
for each detected sperm cell, applying the series of thumbnail images as input data to a classification neural network, the classification neural network being configured to classify the sperm cell from among predetermined morphological classes.

14. The device as claimed in claim 13, wherein a no image-forming optic extends between the image sensor and the sample.

15. The device as claimed in claim 14, wherein the holding structure is configured to maintain a fixed distance between the image sensor and the sample.

16. The device as claimed in claim 13, wherein:
the image sensor extends on a detection plane;
the device comprises an optical system, extending between the image sensor and a support plane, the optical system defining an image plane and an object plane, the device being such that:
the image plane is offset with respect to the detection plane by an image defocusing distance; and/or
the support plane is offset with respect to the object plane by an object defocusing distance.

17. The device as claimed in claim 16, wherein:
the holding structure comprises a sample support, mounted on a spring;
the optical system is linked mechanically to a stop; and
the spring is arranged such that the sample support is pressed against the stop so as to maintain a distance between the optical system and the sample.

* * * * *